United States Patent [19]

Hanna et al.

[11] Patent Number: 4,676,813
[45] Date of Patent: Jun. 30, 1987

[54] METHOD AND APPARATUS FOR FORMING GLASS FIBERS

[75] Inventors: Terry J. Hanna, Newark; Neil E. Greene, Granville, both of Ohio

[73] Assignee: Owens-Corning Fiberglas Corporation, Toledo, Ohio

[21] Appl. No.: 809,999

[22] Filed: Dec. 17, 1985

[51] Int. Cl.⁴ .............................................. C03B 37/08
[52] U.S. Cl. .............................................. 65/2; 65/1; 65/12
[58] Field of Search .................................... 65/1, 2, 12

[56] References Cited

U.S. PATENT DOCUMENTS

| | | | |
|---|---|---|---|
| 3,269,816 | 8/1966 | Helbing | 65/2 |
| 3,294,503 | 12/1966 | Machlan et al. | 65/1 |
| 3,697,241 | 10/1972 | Strickland et al. | 65/2 |
| 3,773,483 | 11/1973 | Schmidt | 65/2 |
| 3,775,074 | 11/1973 | Russell | 65/2 |
| 4,436,541 | 3/1984 | Pelligrin et al. | 65/2 |
| 4,488,891 | 12/1984 | Grubka et al. | 65/2 |
| 4,553,994 | 11/1985 | Greene et al. | 65/2 |

Primary Examiner—Robert Lindsay
Attorney, Agent, or Firm—Ronald C. Hudgens; Greg Dziegielewski; Ronald E. Champion

[57] ABSTRACT

A feeder system for the production of glass filaments is rendered dripless or non-dripless on demand by controlling the pressure of the air in contact with the streams and beads of the orificed discharge wall. Preferably, the feeder is rendered non-dripless when the restart of filament formation from idled orifices is desired.

13 Claims, 1 Drawing Figure

METHOD AND APPARATUS FOR FORMING GLASS FIBERS

TECHNICAL FIELD

The invention disclosed herein relates to the production of glass fibers wherein process interruptions from bead drops and flooding are reduced while providing improved restartability.

BACKGROUND OF THE INVENTION

In the production of glass filaments, it is conventional to flow streams of molten glass from closely spaced orifices in the bottom or discharge wall of an electrically heated, precious metal alloy feeder or bushing.

For the production of continuous glass filaments, there are two general types of feeders available. The more widely used type employs a bottom wall having stream defining orifices provided in projections or tips, depending from the exterior surface of the bottom wall. The second, a more recently developed type, employs an orificed bottom wall having a planar exterior surface. The first type is known as a "tipped" feeder; for example, see U.S. Pat. Nos. 4,222,757 and 4,321,074. The second type of feeder is known as a "tipless" feeder; for example, see U.S. Pat. No. 3,905,790.

Historically, glass fiber forming operations have been plagued by primarily two phenomena occurring after a filament break—flooding and bead drops.

Recently, a glass fiber forming system has been developed that dramatically reduces the effects of disruptive filament breaks. U.S. Pat. No. 4,488,891, issued to Grubka et al, discloses a fiber forming system otherwise known as "dripless". That is, during operation if a filament breaks, the glass will cease to flow from the orifice associated with the break while attenuation is maintained from the remaining orifices. Thus, the glass does not drip from the orifice of the severed filament.

The advantages of such a system are clear. One of the disadvantages is increased "restart" times, as compared to conventional feeders, when the number of filament breaks ultimately requires the restart of the attenuation process at the disrupted/idled orifices.

SUMMARY OF THE INVENTION

This invention provides, in part, the decreased sensitivity to filament breaks provided by the "dripless" types of feeders while also providing, in part, the ease of "restartability" provided by the heretofore "conventional" or "non-dripless" types of feeders.

This is accomplished by controlling the pressure of the atmosphere at the discharge wall of the feeder to establish "dripless" operation during production and "non-dripless" operation to facilitate the restart of filament formation as desired.

DESCRIPTION OF THE DRAWING

The FIGURE is a schematic front elevational view of a glass fiber forming operation.

BEST MODE OF CARRYING OUT THE INVENTION

Figure 1:
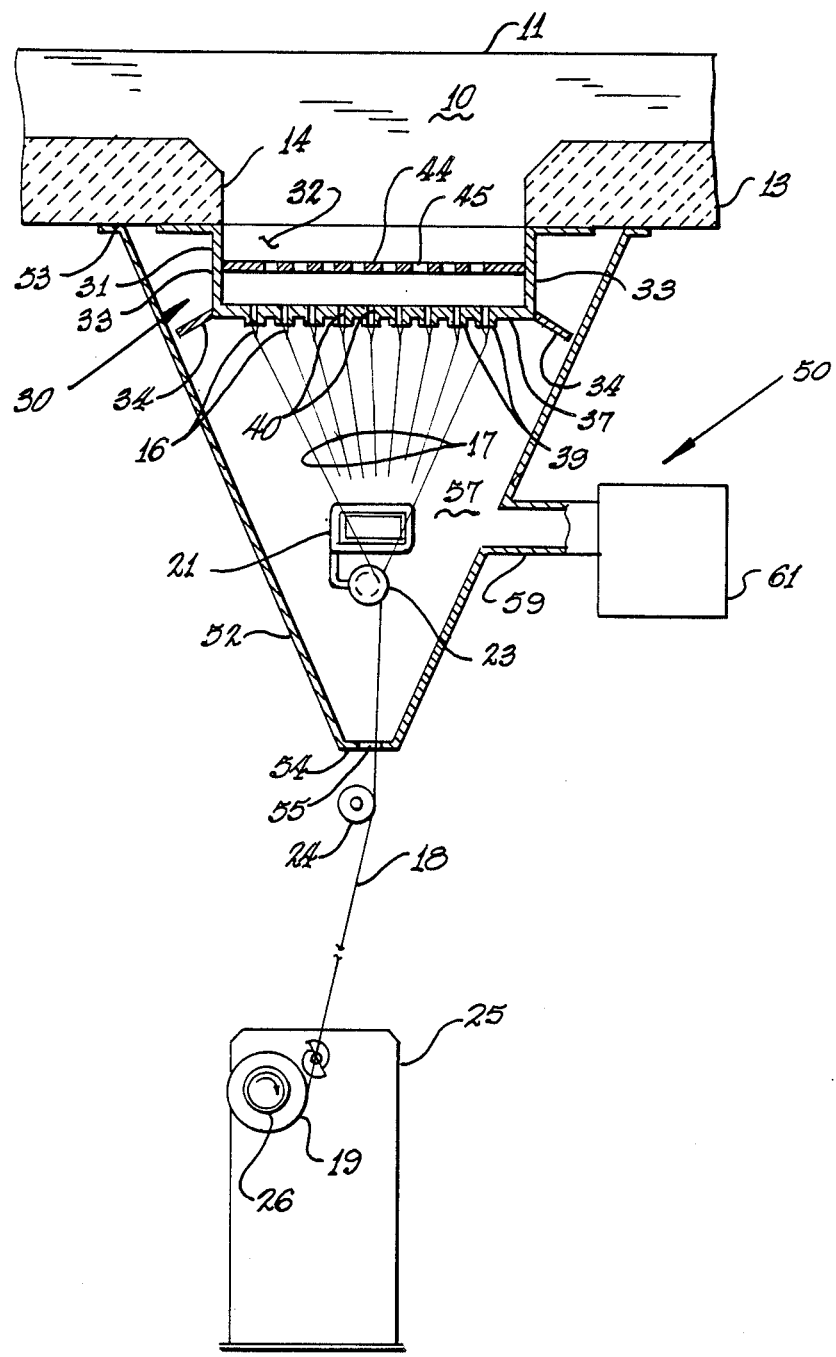

As shown in the drawing, conically shaped streams of molten glass 16, otherwise known as forming cones issuing from feeder 30, are attenuated into a plurality of filaments 17 through the action of attenuation means or winder 25. The newly formed filaments 17 receive a protective coating or sizing from coating applicator 21 as is known in the art. The coated filaments 17 are then gathered into a strand 18 at gathering means 23, which is collected as a helically wound package 19 on collet 26 of winder 25.

As such, the filaments formed are continuous filaments. However, it is to be understood that feeders employing the principles of the present invention are also readily applicable to the formation of discontinuous filaments and/or association with other attenuation means. Further, such feeders may be employed in the fiberization of other inorganic materials.

For the purposes of clarity, no cooling system for cooling the forming region and the newly formed glass fibers is shown. However, it is to be understood that any suitable cooling system, such as finshields and/or convective air cooling, may be employed.

As will be explained in more detail later herein, the overall or total head of the body of molten glass 10, that is, the depth of the glass from top surface 11 to discharge wall 37, preferably remains substantially constant with the present invention providing adjustable control of the pressure of the atmosphere at discharge wall 37.

As shown, feeder 30 is positioned at well 14 in the refractory of channel 13 which carries the body or pool of molten glass 10 to feeder 30 from a furnace (not shown). Feeder means 30 is, in part, comprised of sidewalls 32, endwalls 33 and a discharge wall 37 forming a container 31 which abuts the refractory of channel 13 at well 14 to retain the molten glass therein. As is known in the art, a pair of terminals or ears 34 are suitable attached to endwalls 33 (or discharge wall 37). Ears 34 are adapted to be connected to a suitable source of electrical energy (not shown) to provide electrical resistance heating of the feeder 30. Discharge wall 37 includes a plurality of projections 39 depending therefrom. Each projection 39 has at least one orifice 40 adpated to permit the molten glass to issue therefrom as a stream 16. It is to be understood that the present invention is readily employed with "tipless" feeders also.

According to the principles of this invention, feeder means 30 and atmosphere pressure control system 50 are designed to provide dripless and non-dripless operating characteristics when desired. Specifically, feeder 30 is rendered non-dripless when the restart of filament attenuation is desired from idled orifices, that is, orifices at which filament attenuation has been disrupted.

According to the aforementioned U.S. Pat. No. 4,488,891, which is hereby entirely incorporated herein by reference, dripless operation is established by providing a layer of molten glass over the discharge wall such that the pressure of the molten glass at the orifices is less than the internal pressure of a bead formed at an orifice upon the cessation of filament attenuation at that orifice but greater than the internal pressure of the forming cones during attenuation. As such, the pressure of the molten glass at the discharge plate orifices prevents bead growth and drop from the orifices whereby the flow of molten glass from the disrupted orifices ceases. In orther words, for "dripless" operation, the pressure of the molten glass at the orifices of the discharge wall is (1) less than the internal pressure of the bead formed at a given orifice upon breakout at that orifice while the remainder of the orifices operate normally to produce filaments, and (2) greater than the internal pressure of the cones established during steady state attenuation. Since the pressure of the gaseous body, i.e., air, in contact with the streams and beads of molten glass is "atmospheric", the molten glass is throttled or supplied such that the efffective head pressure of the glass at the exit of the orifices is substantially atmospheric for dripless operation.

The fiber forming systems, of the instant invention, employ the same principles as set forth in the aforementioned patent, except that the pressure of the gaseous body or atmosphere at discharge wall 37 in contact with the streams and beads of molten glass is selectively varied to, in part, provide the proper pressure relationship between the molten glass and the gaseous body at the discharge orifices to establish dripless and non-dripless operation as desired.

With either mode, that is (a) maintaining the pressure of the air in contact with the streams and beads at "atmospheric" or (b) varying the pressure of such gaseous body according to the principles of this invention, the flow of molten glass from an orifice stops upon a filament break at that orifice, yet the pressure is sufficient for maintenance of filament formation at the remaining orifices, hence "dripless" operation.

As employed herein, "non-dripless" refers to the characteristic of the feeder system wherein molten glass begins to flow or continues to flow from an orifice 40 to form a dripable bead or flow randomly over the face of the discharge wall 37 if no filament is being drawn at the orifice. As such, the pressure of the molten glass at the orifices 40 of discharge wall 37 is greater than the internal pressure of a bead formed at one of such orifices. This facilitates or permits the initiation or restart of filament production from the orifices.

As shown, the filament forming zone pressure control system 50 is comprised of a housing 52 suitably connected to a variable pressure means or source 61 for varying the pressure of the gaseous body in chamber 57 in housing 52. Although housing 52 is shown enclosing size applicator means 21 and gathering shoe 23, it is to be understood that housing 52 may only surround the fiber forming region along discharge wall 37 to permit the control of the pressure of the gaseous body, which is preferably air, therein according to the principles of this invention.

Although not illustrated, housing 52 is desirably equipped with an access door or the like to permit the operator to have access to the equipment and glass filaments therein for equipment adjustments, restart of attenuation and the like. As shown, first end 53 of housing 52 is suitably secured at channel 13 surrounding feeder 30. Chamber 57 of housing 52 is connected to variable air pressure source 61 via conduit 59. Second or distal end 54 of housing 52 has a hole 55 adapted to permit strand 18 to exit housing 52. Desirably, guide roll 24 is employed in combination with gathering shoe 23 to align advancing strand 18 within hole 55.

In one embodiment or mode of operation, control system 50 is adapted to (a) provide and maintain a gaseous body at positive pressure at discharge wall 37, that is, pressure greater than atmospheric pressure, during production attenuation of filaments to establish "dripless" operation, and (b) reduce the pressure of the gaseous body to atmospheric pressure in the fiber forming zone to establish non-dripless operation to promptly restart the flow of molten glass from the idled orifices. The effective head pressure of the molten glass at orifice 40 in this embodiment should be greater than atmospheric pressure which would cause the molten glass to flow from the orifices 40 even though no filaments were being drawn therefrom if it were not for the additional counterbalancing force provided by the positive pressure of the gaseous body, within chamber 57 in contact with the beads of molten glass at an idled orifice. Thus, when the pressure of the air within chamber 57 is reduced to atmospheric, the flow of molten glass from such idled orifices is promptly restarted due to the pressure differential across the idled orifice which permits the restart of filament formation from such idled orifices. The pressure of the air in chamber 57 may be readily reduced to atmospheric by deactivating pressure means 61 and/or opening the access door (not shown) of housing 52. As such, the various screens, baffes, and the like generally located within the container 31 of feeder 30, such as apertured plate 44 as shown in the drawing, do not provide a pressure drop as large as provided by the perforate pressure plate immediately above the discharge wall according to the principles as set forth in the aforementioned U.S. Pat. No. 4,488,891. Desirably, however, the pressure drop through the apertures 45 of plate 44 is sufficient to provide a relatively low effective head pressure of the molten glass at orifices 40.

By employing a relatively low effective head pressure at the discharge wall, the positive pressure of the gaseous body in chamber 57 need only be relatively modest to provide enough force to counterbalance the forces urging the molten glass from the idled orifice or orifices. For example, apertured plate 44 may be designed according to the principles as set forth in U.S. Pat. No. 4,436,541 issued to Pellegrin, et al on Mar. 13, 1984 to reduce the total head pressure of the molten glass to a substantially lower effective head pressure at the orifices 40. It is to be understood, however, that no such reduction in pressure of the molten glass is necessarily required.

As an alternative to providing flow resistance plates within the body of molten glass in channel 13 and feeder 30, a separate relatively shallow layer of molten glass may be established over discharge wall by employing the principles as set forth in concurrently filed U.S. patent application, Ser. No. 810009, filed in the names of Larry J. Huey and Jerome F. Marra, which is hereby incorporated by reference.

In another embodiment or mode of operation, control system 50 is adapted (a) to provide and maintain atmospheric pressure within chamber 57 during filament production to provide dripless operation, and (b) establish negative pressure or vacuum (i.e., pressure less than atmospheric) within chamber 57 to restart the flow of molten glass from idled orifices. As such, orifice discharge wall 37 and apertured plate 44 as part of feeder 30 are designed according to the principles set forth in aforementioned U.S. Pat. No. 4,488,891. Accordingly, with the chamber 57 being at atmospheric pressure, feeder 30 will operate in a dripless manner. Upon drawing a vacuum within chamber 57, a pressure imbalance is created at the surface of the molten glass at the idled discharge orifices, whereby the flow of molten glass resumes. Thus, the restart of the filament formation process is facilitated.

Thus, through the use of the instant invention, the filament forming process can be rendered dripless or non-dripless as desired by controlling the pressure of the gaseous body within control chamber 57 in contact with the streams and beads of molten glass on demand of the operator.

It is to be understood that more than one feeder or bushing may be located within a given control system or chamber according to the principles of this invention. Further, it is to be understood, even though the gas within chamber 57 is preferably "air", any suitable gaseous medium may be employed.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:

1. A method of producing inorganic filaments comprising:
    providing molten inorganic material to a feeder having an orificed discharge wall adapted to provide streams of molten inorganic material for attenuation into filaments;
    enclosing said feeder and said streams of molten inorganic material with a housing;
    connecting said housing to a variable pressure source of gaseous material to provide a gaseous body within said housing;
    and varying the pressure of the gaseous body in contact with the discharge wall and the streams of molten material within said housing to establish dripless operation during filament production and non-dripless operation to facilitate restart of filament formation as desired.

2. The method of claim 1 wherein the pressure of the gaseous body is greater than atmospheric to establish dripless operation.

3. The method of claim 2 wherein the pressure of the gaseous body is substantially atmospheric to establish non-dripless operation.

4. The method of claim 1 wherein the pressure of the gaseous body is less than atmospheric to establish non-dripless operation.

5. The method of claim 4 wherein the pressure of the gaseous body is substantially atmospheric to establish dripless operation.

6. The method of claim 1 wherein said gaseous body is air.

7. Apparatus for the production of glass filaments comprising:
    feeder means having an orificed discharge wall adapted to provide streams of molten glass for attenuation into filaments;
    a housing surrounding said feeder and the streams of molten glass issuing therefrom;
    a variable pressure source of gaseous material connected to said housing to provide a gaseous body within said housing;
    and control means for varying the pressure of said gaseous body in contact with the discharge wall and the streams of molten glass issuing therefrom within said housing to establish dripless operation during production and non-dripless operation to facilitate restart of filament operation as desired.

8. The apparatus of claim 7 wherein said control means is comprised of a housing defining, at least in part, a chamber adapted to provide and maintain a gaseous body at a pressure different than atmospheric pressure, said chamber containing said discharge wall, said chamber also containing said gaseous body and being in communication with a variable pressure means for controlling the pressure of the gaseous body.

9. The apparatus of claim 8 wherein said housing is adapted to contain more than one feeder means.

10. The apparatus of claim 7 wherein said feeder means includes an apertured pressure plate within the molten glass above the discharge wall adapted to reduce the effective head pressure of flowing molten glass at the orifices of the discharge wall to a level greater than atmospheric.

11. The apparatus of claim 10 wherein said control means is adapted to maintain the pressure of said gaseous body at a pressure greater than atmospheric to establish dripless operation.

12. The apparatus of claim 7 wherein said feeder means is adapted to provide flowing molten glass at the orifices of the discharge wall at a pressure substantially equal to atmospheric.

13. The apparatus of claim 12 wherein said control means is adapted to reduce the pressure of the gaseous body within said chamber at said discharge wall to a pressure less than atmospheric to facilitate the restart of the flow of molten glass from idled orifices.

* * * * *